(12) United States Patent
Washio et al.

(10) Patent No.: US 10,530,069 B2
(45) Date of Patent: Jan. 7, 2020

(54) POWER DISTRIBUTION DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kazuhiro Washio, Mie (JP); Yasuo Omori, Mie (JP); Masaaki Tabata, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 15/546,036

(22) PCT Filed: Jan. 21, 2016

(86) PCT No.: PCT/JP2016/051671
§ 371 (c)(1),
(2) Date: Jul. 25, 2017

(87) PCT Pub. No.: WO2016/129349
PCT Pub. Date: Aug. 18, 2016

(65) Prior Publication Data
US 2018/0337463 A1 Nov. 22, 2018

(30) Foreign Application Priority Data

Feb. 10, 2015 (JP) .................................. 2015-024389

(51) Int. Cl.
*H01R 4/2433* (2018.01)
*H01R 4/24* (2018.01)
(Continued)

(52) U.S. Cl.
CPC .............. *H01R 4/2433* (2013.01); *H01R 4/24* (2013.01); *H01R 13/684* (2013.01); *H01R 25/00* (2013.01);
(Continued)

(58) Field of Classification Search
CPC ...... H01R 4/2433; H01R 4/24; H01R 4/2404; H01R 4/2416; H01R 4/2458; H01R 4/2454; H01R 13/514
See application file for complete search history.

(56) References Cited

U.S. PATENT DOCUMENTS 3,950,063 A * 4/1976 Johansson ............ H01R 4/2433
439/404
4,124,265 A * 11/1978 Turk .................... H01R 13/112
439/403
(Continued)

FOREIGN PATENT DOCUMENTS

| JP | 2002-184542 | 6/2002 |
| JP | 2004-127828 | 4/2004 |
| JP | 2004-159478 | 6/2004 |

OTHER PUBLICATIONS

International Search Report dated Mar. 22, 2016.

*Primary Examiner* — James Harvey
*Assistant Examiner* — Matthew T Dzierzynski
(74) *Attorney, Agent, or Firm* — Gerald E. Hespos; Michael J. Porco; Matthew T. Hespos

(57) ABSTRACT

It is aimed to realize miniaturization. A power distribution device (Da) is for supplying power to a plurality of loads (L) and includes an input-side conductive path (10) to be connected to a battery (B) (power supply), a plurality of terminal holders (13) each including an input-side terminal fitting (20) connectable to the input-side conductive path (10), and a plurality of output-side conductive paths (37) configured to connect the input-side terminal fittings (20)
(Continued)

and the loads (L). Since the number of the terminal holders (13) to be connected to the input-side conductive path (10) is a minimum necessary number corresponding to the number of the loads (L), miniaturization is possible.

12 Claims, 18 Drawing Sheets

(51) Int. Cl.
*H01R 25/00* (2006.01)
*H01R 25/16* (2006.01)
*H01R 31/02* (2006.01)
*H01R 13/684* (2011.01)
*H02B 1/20* (2006.01)

(52) U.S. Cl.
CPC ........... *H01R 25/162* (2013.01); *H01R 31/02* (2013.01); *H02B 1/20* (2013.01); *H01R 2201/26* (2013.01)

(56) References Cited

U.S. PATENT DOCUMENTS

| | | | | |
|---|---|---|---|---|
| 4,834,670 A * | 5/1989 | Rodondi | ............. | H01R 4/2462 439/398 |
| 4,840,578 A * | 6/1989 | Sato | ..................... | H01R 4/2425 439/395 |
| 5,399,098 A * | 3/1995 | Marshall | ................ | H01R 4/245 439/397 |
| 5,567,173 A * | 10/1996 | Franckx | ............... | H01R 4/2433 439/403 |
| 5,586,905 A * | 12/1996 | Marshall | .............. | H01R 4/2433 439/463 |
| 5,908,326 A * | 6/1999 | Neuhauser | ........... | H01R 4/2454 439/398 |
| 6,692,311 B1 * | 2/2004 | Kamei | ................. | H01R 9/2458 439/218 |
| 6,960,097 B2 * | 11/2005 | Morishita | .............. | H01R 9/053 439/394 |
| 7,347,717 B2 * | 3/2008 | Taylor | .................... | H01R 4/245 439/409 |
| 7,396,264 B2 * | 7/2008 | Cheng | ................... | H01R 11/05 439/857 |
| 7,413,465 B2 * | 8/2008 | Taylor | .................... | H01R 4/245 439/409 |
| 7,798,841 B2 * | 9/2010 | Pearson | ................. | H01R 4/183 439/423 |
| 2004/0142602 A1 | 7/2004 | Kamei et al. | | |
| 2004/0219806 A1 | 11/2004 | Kobayashi | | |
| 2011/0117769 A1 * | 5/2011 | Okamura | ............... | H01R 4/185 439/395 |

\* cited by examiner

POWER DISTRIBUTION DEVICE

BACKGROUND

1. Field of the Invention

The invention relates to a power distribution device.

2. Description of the Related Art

Japanese Unexamined Patent Publication No. 2004-159478 discloses a power distribution device for distributing power supplied from a power supply for vehicle to loads, such as electrical components. This power distribution device has a busbar accommodated in a box, and the busbar includes a base portion and branches formed on the base. An input-side cable for supplying power to the busbar is connected to the base and the power supplied to the busbar is supplied to the loads by way of the branches.

The number of electrical components actually mounted in a vehicle differs depending on the grade of the vehicle and the selection of options, but the number of branches formed on a busbar is set to correspond to all the mountable electrical components. Thus, the number of the branches increases, leading to the enlargement of the busbar and, eventually, to the enlargement of a power distribution device.

The invention was completed based on the above situation and aims to achieve miniaturization.

SUMMARY

The invention is directed to a power distribution device for distributing power to a plurality of loads. The power distribution device includes an input-side conductive path to be connected to a power supply, terminal holders each including a terminal fitting connectable to the input-side conductive path, and output-side conductive paths configured to connect the terminal fittings and the loads.

The number of the terminal holders to be connected to the input-side conductive path is a minimum necessary number corresponding to the number of the loads. Thus, miniaturization is possible.

The input-side conductive path may be a coated cable in which a conductor is surrounded by an insulation coating, and a connection area to the terminal fitting in the input-side conductive path may have the insulation coating removed. This enables the terminal fitting and the conductor to be connected reliably.

The terminal fitting may include a pressure contact blade to be brought into pressure contact with the conductor. According to this configuration, an operation of connecting the terminal fitting to the input-side conductive path is easy.

The terminal holder may include a separation restricting member configured to restrict the separation of the terminal fitting and the input-side conductive path. This enables a connected state of the terminal fitting and the input-side conductive path to be held.

An end part of the input-side conductive path may be formed into a flexible conductive path having flexibility and connectable to the terminal fittings, and the flexible conductive path may be pulled out to the outside of a case in a state accommodated in the case. According to this configuration, only an area of the flexible conductive path to be connected to the terminal fittings has to be pulled out to the outside of the case. Therefore a space taken up by the entire power distribution device can be reduced.

DETAILED DESCRIPTION

Figure 1:
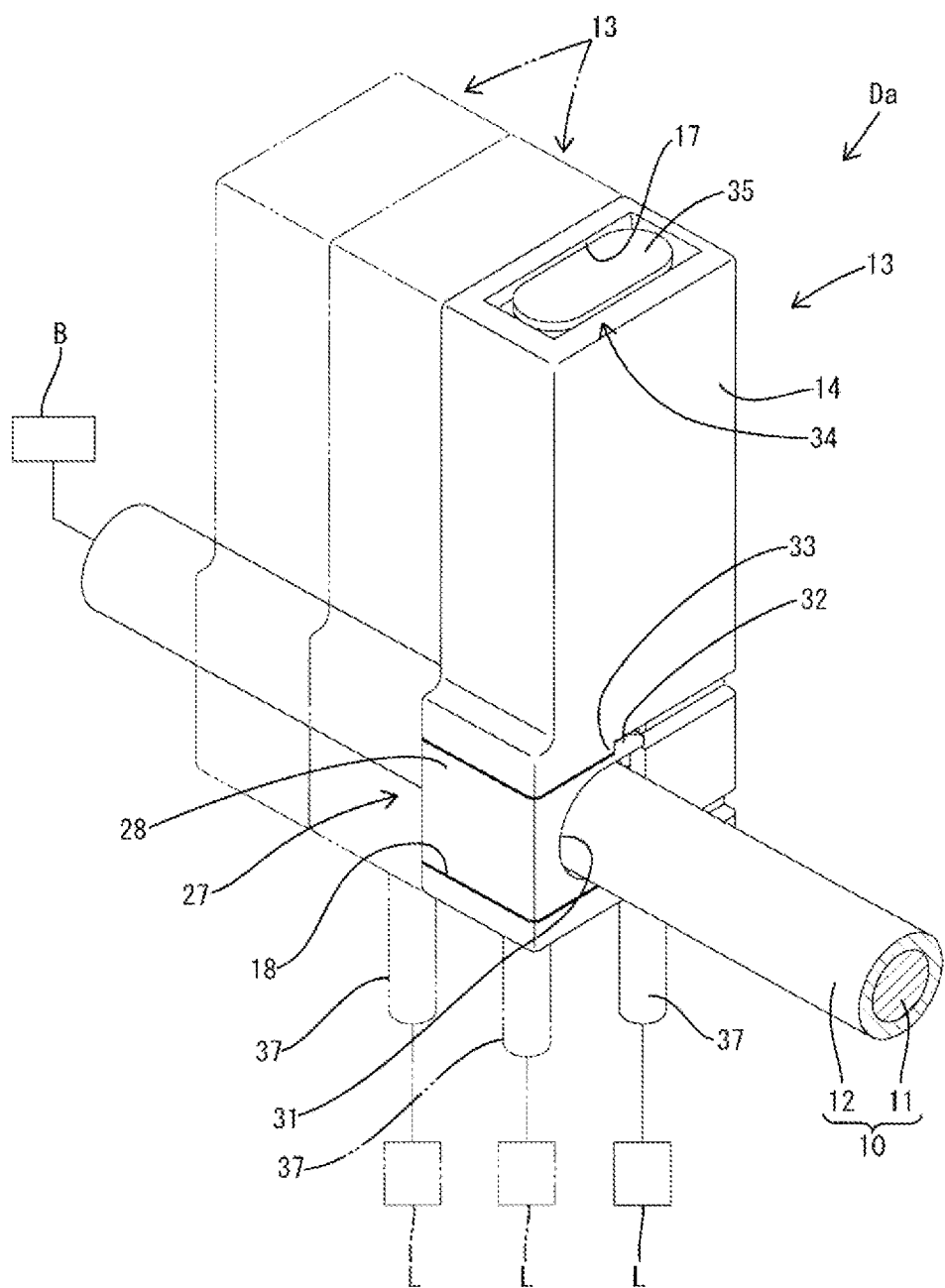
FIG. 1 is a perspective view of a power distribution device of a first embodiment.

A first embodiment of the invention is described with reference to FIGS. 1 to 10. As shown in FIG. 1, a power distribution device Da of the first embodiment is a device for distributing power supplied from a battery B (power supply as claimed) of an automotive vehicle to a plurality of loads L (electrical components and the like). The power distribution device Da includes an input-side conductive path 10 to be connected to the power supply, as many terminal holders 13 as there are loads L and as many output-side conductive paths 37 as there are loads L.

As shown in FIG. 1, the input-side conductive path 10 is configured by a coated cable in which one conductor 11 is surrounded by a cylindrical insulation coating 12. A base end part of the input-side conductive path 10 is connected to the battery B, and power supplied from the battery B is distributed to the loads L on a leading end side of the input-side conductive path 10. Note that an axis of the input-side conductive path 10 is oriented in a front-rear direction for the sake of convenience.

Figure 4:
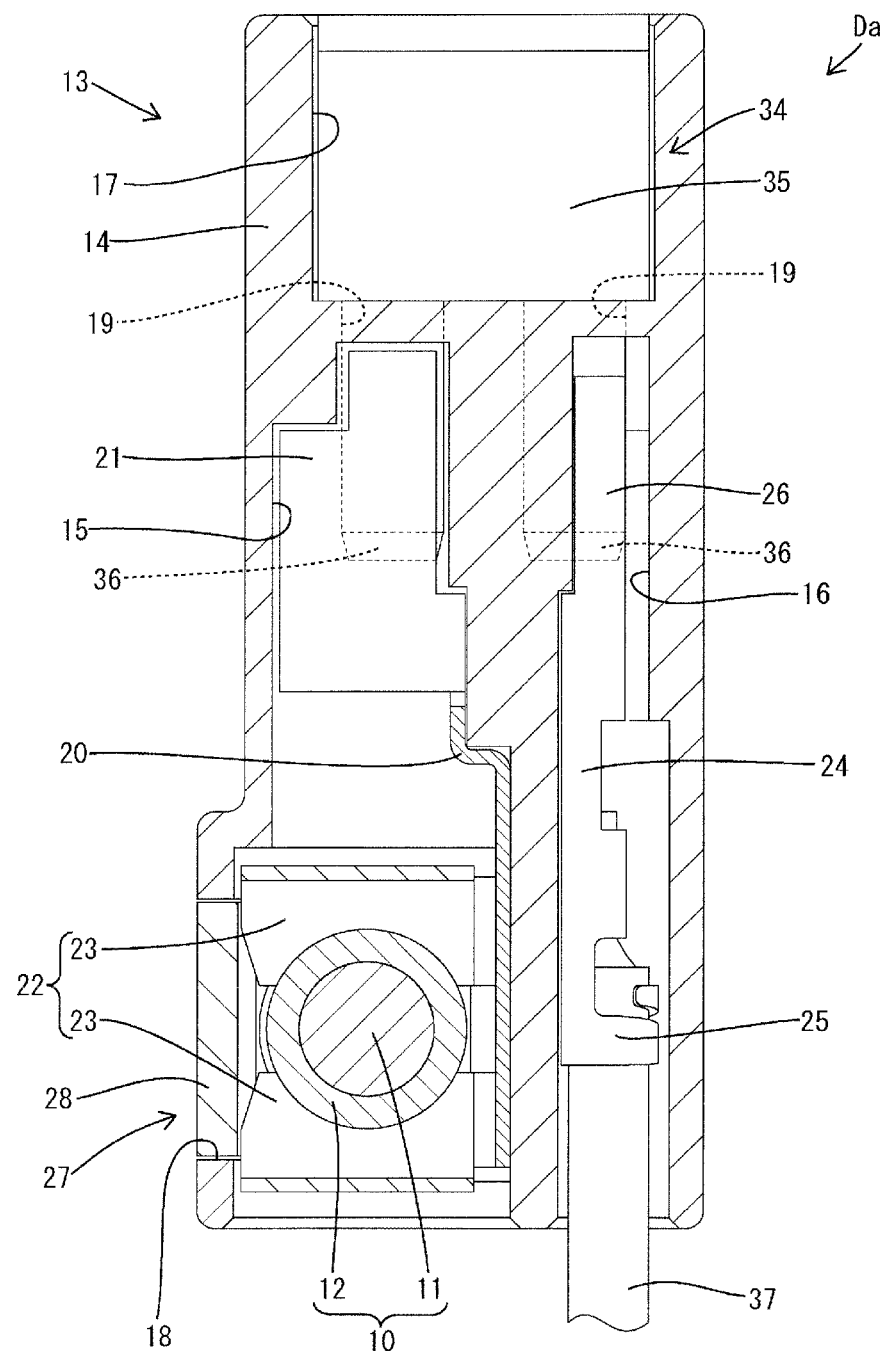
FIG. 4 is a front view in section of the power distribution device.
Figure 5:
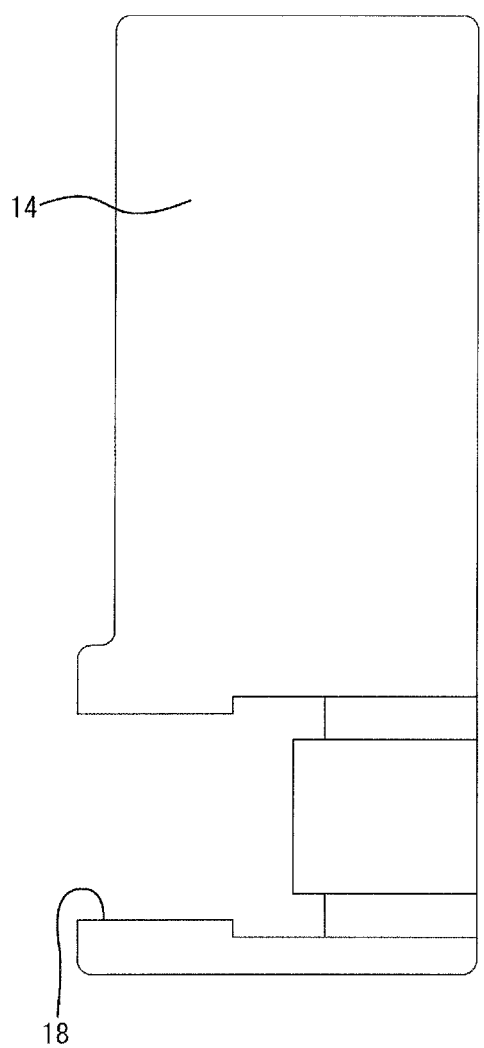
FIG. 5 is a front view of a housing constituting a terminal holder.

As shown in FIG. 4, the terminal holder 13 includes a housing 14 made of synthetic resin, one input-side terminal fitting 20 (terminal fitting as claimed), one output-side terminal fitting 24, one cap 27 (separation restricting member as claimed) and one fuse 34. An input-side terminal accommodating chamber 15, an output-side terminal accommodating chamber 16 and a fuse accommodating chamber 17 are formed inside the housing 14. The input-side terminal accommodating chamber 15 is arranged in a left area inside the housing 14 and open in the lower end surface of the housing 14. A cutout 18 is open in both front and rear surfaces and left side surface of the housing 14 in a lower end part of the input-side terminal accommodating chamber 15 to avoid interference with the input-side conductive path 10.0

The output-side terminal accommodating chamber 16 is arranged in a right area inside the housing 14 and is open in the lower end surface of the housing 14. The fuse accommodating chamber 17 is arranged above the input-side terminal accommodating chamber 15 and the output-side terminal accommodating chamber 16 and is open in the upper end surface of the housing 14. The fuse accommodating chamber 17 and the input-side terminal accommodating chamber 15 communicate via a communication hole 19, and the fuse accommodating chamber 17 and the output-side terminal accommodating chamber 16 also communicate via a communication hole 19.

The input-side terminal fitting 20 is long in a vertical direction and is accommodated into the input-side terminal accommodating chamber 15 through an opening in the lower end surface of the housing 14. The accommodated input-side terminal fitting 20 is held by an unillustrated locking means. An input-side fuse connecting portion 21 ris formed on an upper end part of the input-side terminal fitting 20, and front and rear spring pieces are arranged opposite to each other in the input-side fuse connecting portion 21. The input-side fuse connecting portion 21 is arranged below the communication hole 19.

Figure 6:
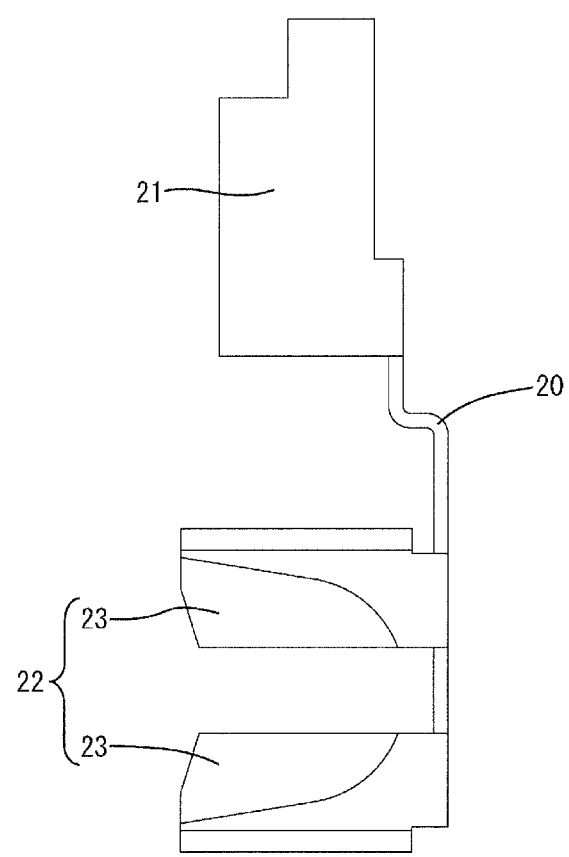
FIG. 6 is a front view of an input-side terminal fitting.
Figure 7:
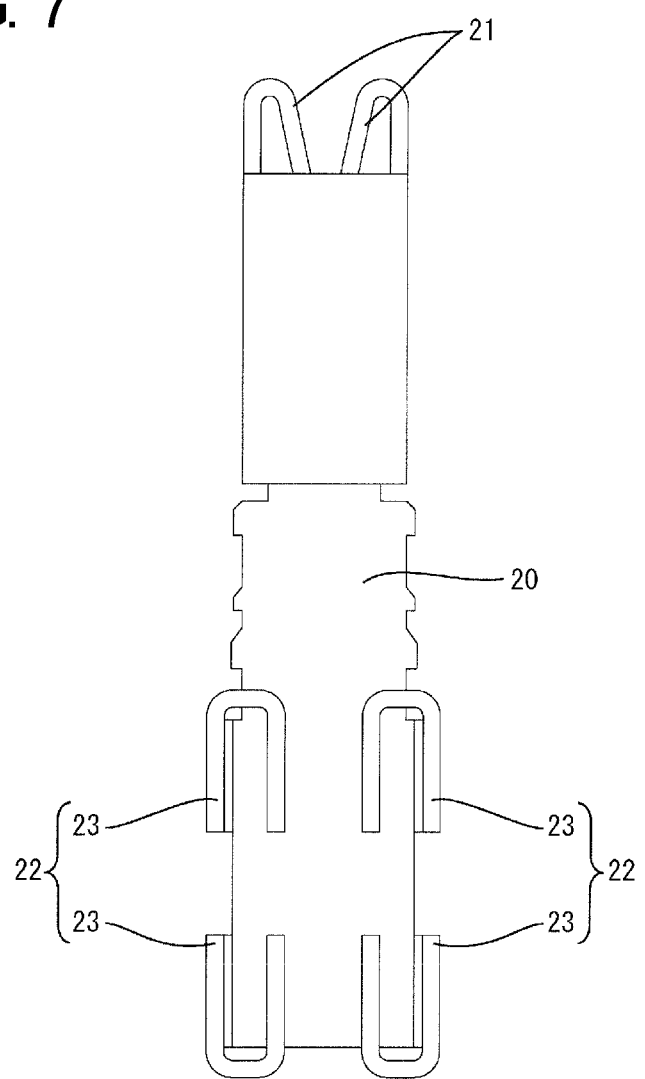
FIG. 7 is a left side view of the input-side terminal fitting.
Figure 8:
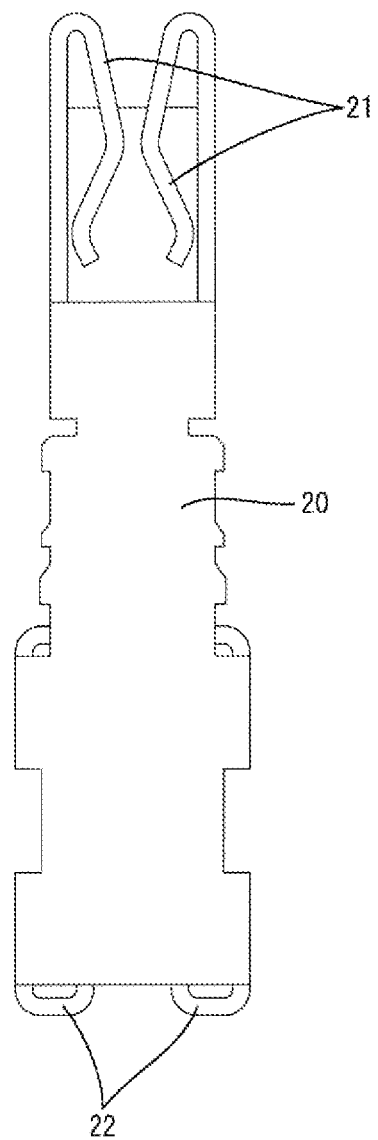
FIG. 8 is a right side view of the input-side terminal fitting.

Front and rear pressure contact blades 22 are formed on a lower end part of the input-side terminal fitting 20. The pressure contact blades 22 are arranged to correspond to the cutout 18 of the housing 14 and are exposed to the outside of the housing 14 in the cutout 18. As shown in FIGS. 6 and 7, the pressure contact blade 22 includes upper and lower blades 23 and a space between the blades is open leftward similarly to the cutout 18. Thus, the pressure contact blades 22 are brought into pressure contact with the input-side conductive path 10 from the right.

As shown in FIG. 4, the output-side terminal fitting 24 is long and narrow in the vertical direction and is accommodated into the output-side terminal accommodating chamber 16 through an opening in the lower end surface of the housing 14. The accommodated output-side terminal fitting 24 is held by an unillustrated locking means. A crimping portion 25 in the form of an open barrel is formed on a lower end part of the output-side terminal fitting 24. This crimping portion 25 is crimped and conductively connected to a base end part of the output-side conductive path 37. An output-side fuse connecting portion 26 is formed on an upper end part of the output-side terminal fitting 24 and front and rear spring pieces are arranged opposite to each other in the output-side fuse connecting portion 26. The output-side fuse connecting portion 26 is arranged below the communication hole 19.

Figure 2:
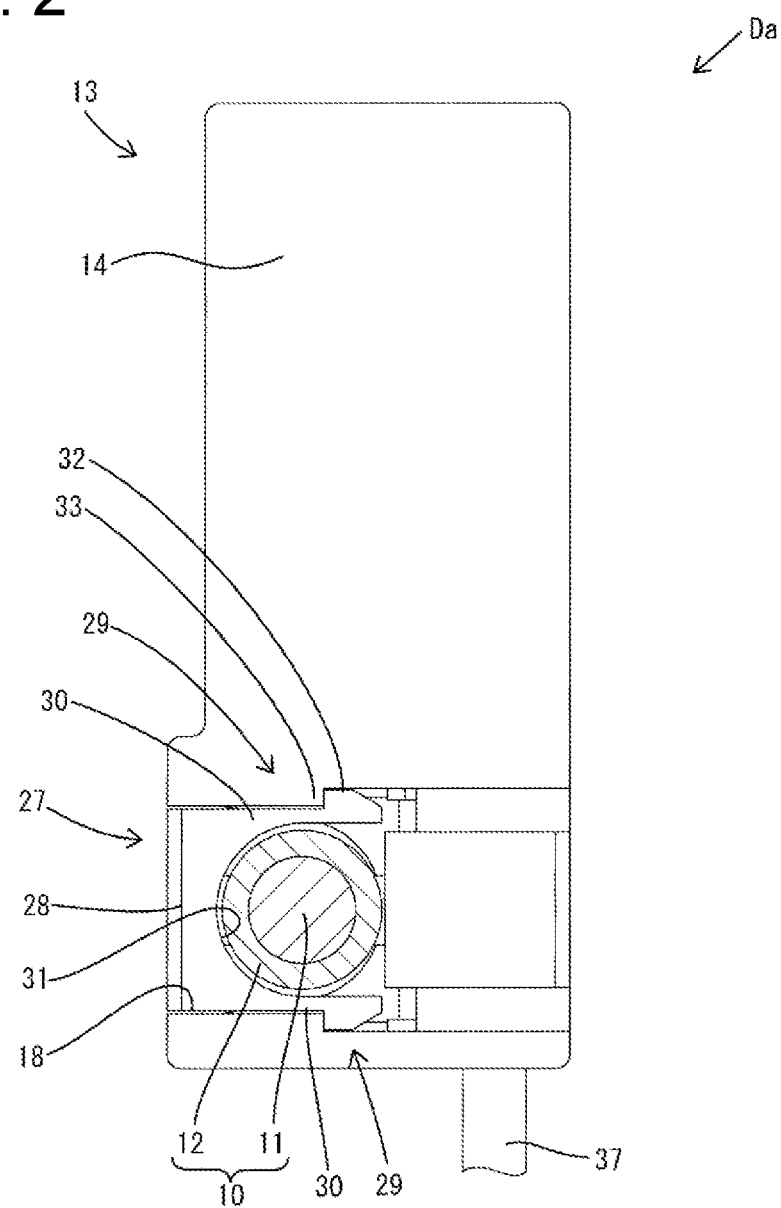
FIG. 2 is a front view of the power distribution device.
Figure 3:
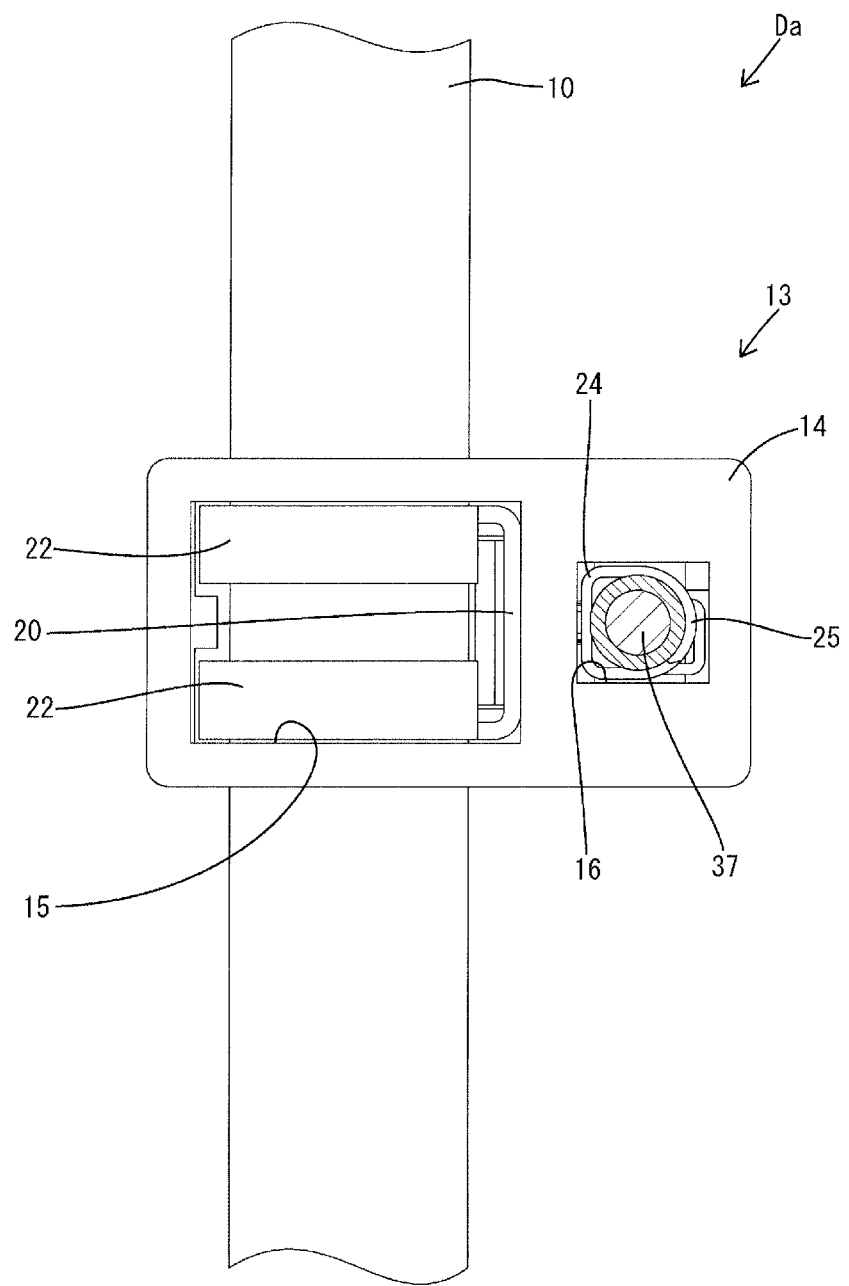
FIG. 3 is a bottom view of the power distribution device.
Figure 9:
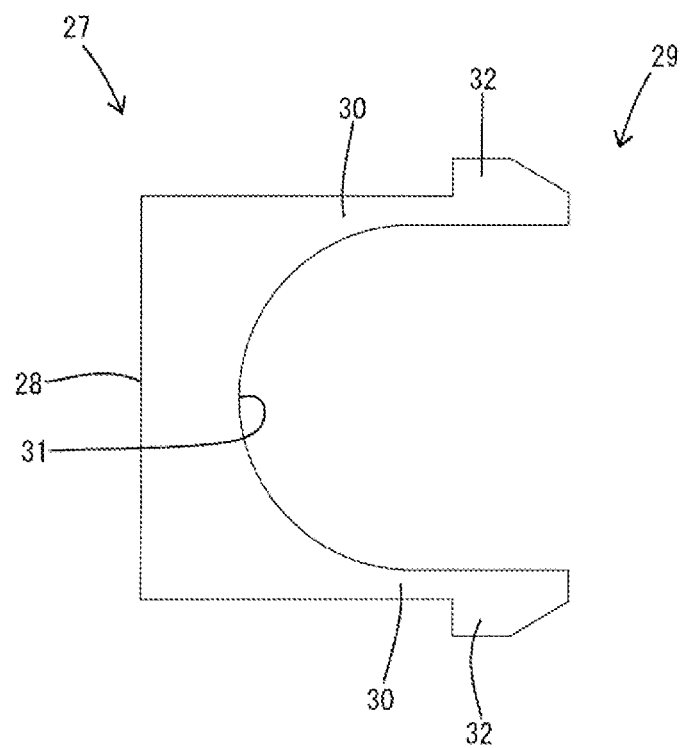
FIG. 9 is a front view of a cap.
Figure 10:
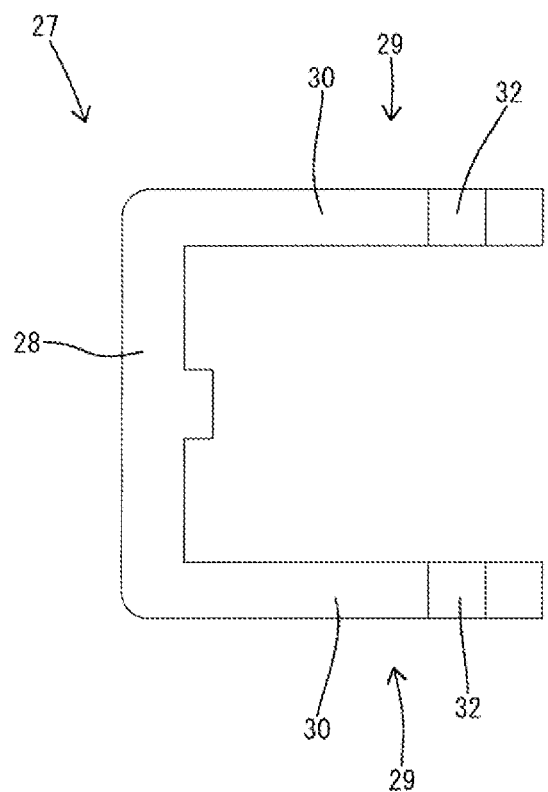
FIG. 10 is a plan view of the cap.

The cap 27 is made of synthetic resin and, as shown in FIGS. 9 and 10, is a single component including a body 28 substantially in the form of a flat plate and front and rear locking portions 29 extending right from both front and rear edges of the body 28. Each locking portion 29 includes two resilient arms 30 and a space between the resilient arms 30 is open rightward of the cap 27. Further, an area of the locking portion 29 connecting base end parts of the upper and lower resilient arms 30 serves as a substantially semi-circular restricting edge 31. A radius of curvature of the restricting edge 31 is substantially equal to that of the outer periphery of the input-side conductive path 10. The cap 27 is mounted into the cutout 18 of the housing 14 from the left. As shown in FIG. 2, the mounted cap 27 is held mounted by the locking of projections 32 on the tips of the resilient arms 30 and stepped stoppers 33 formed in the housing 14. In the mounted state, a left opening of the cutout 18 is closed by the body 28.

As shown in FIG. 4, the fuse 34 includes a fuse body 35 accommodating a fusible portion (not shown) inside and left and right terminals 36 projecting from the lower end surface of the fuse body 35. The fuse 34 is accommodated into the fuse accommodating chamber 17 through an opening in the upper end surface of the housing 14. The accommodated fuse 34 is held accommodated by an unillustrated locking means. By accommodating the fuse 34 into the housing 14, one terminal 36 is connected to the input-side fuse connecting portion 21 through one communication hole 19 and the other terminal 36 is connected to the output-side fuse connecting portion 26 through the other communication hole 19.

Next, functions of this first embodiment are described. In assembling the power distribution device Da, the leading end part of the output-side conductive path 37 is connected to each load L (electrical component or the like) to be mounted in the vehicle and the output-side terminal fitting 24 fixed to the base end part of the output-side conductive path 37 is accommodated into the output-side terminal accommodating chamber 16 of the housing 14. Note that the input-side terminal fitting 20 and the fuse 34 are mounted in the housing 14. The terminal holder 13 connected to this load L in this way is connected to the input-side conductive path 10.

In connecting the terminal holder 13 to the input-side conductive path 10, the insulation coating 12 of the input-side conductive path 10 in a connection area to the input-side terminal fitting 20 is removed to expose the conductor 11. Then, the pressure contact blades 22 are brought into pressure contact with this exposed conductor 11 from right. In this way, the conductor 11 is sandwiched between the upper and lower blades 23 and the input-side conductive path 10 and the input-side terminal fitting 20 are connected conductively. After the input-side terminal fitting 20 is connected to the input-side conductive path 10, the cap 27 is mounted to close the opening of the cutout 18 in the left side surface.

When the cap 27 is mounted, the restricting edges 31 of the cap 27 are facing in contact with or in proximity to the outer periphery of the insulation coating 12 of the input-side conductive path 10. Thus, the conductor 11 (input-side conductive path 10) is restricted not to separate leftward (in a separating direction) from the pressure contact blades 22 (input-side terminal fitting 20). In the above way, the terminal holder 13 is assembled with the input-side conductive path 10 and held in the assembled state.

Thereafter, each of the terminal holders 13 connected to the other loads L is assembled with the input-side conductive path 10 and the input-side terminal fitting 20 thereof and the conductor 11 are connected conductively in a manner similar to the above. At this time, if the housings 14 of adjacent terminal holders 13 are held in contact and set in the same posture (orientation), the entire device can be made compact.

As described above, the power distribution device Da of this first embodiment is for supplying power to the loads L, and includes the input-side conductive path 10 to be connected to the battery B, the terminal holders 13 each having the input-side terminal fitting 20 connectable to the input-side conductive path 10, and the output-side conductive paths 37 configured to individually connect the input-side terminal fittings 20 and the loads L via the output-side terminal fittings 24. In this power distribution device Da, the number of the terminal holders 13 to be connected to the input-side conductive path 10 is equal to the number of the loads L, i.e. a minimum necessary number corresponding to the number of the loads L. Thus, miniaturization is realized.

Further, the input-side conductive path 10 is a coated cable in which the conductor 11 is surrounded by the insulation coating 12 and the insulation coating 12 is removed in advance in the connection area of the input-side conductive path 10 to the input-side terminal fitting 20 before the input-side terminal fitting 20 is connected to the input-side conductive path 10. In this way, the input-side terminal fitting 20 and the conductor 11 can be connected reliably. Further, since the input-side terminal fitting 20 includes the pressure contact blades 22 to be brought into pressure contact with the conductor 11, the operation of connecting the input-side terminal fitting 20 to the input-side conductive path 10 is easy as compared to a connection method by crimping. Further, since the terminal holder 13 includes the cap 27 for restricting the separation of the input-side terminal fitting 20 and the input-side conductive path 10, the input-side terminal fitting 20 and the input-side conductive path 10 can be reliably held connected.

Figure 11:
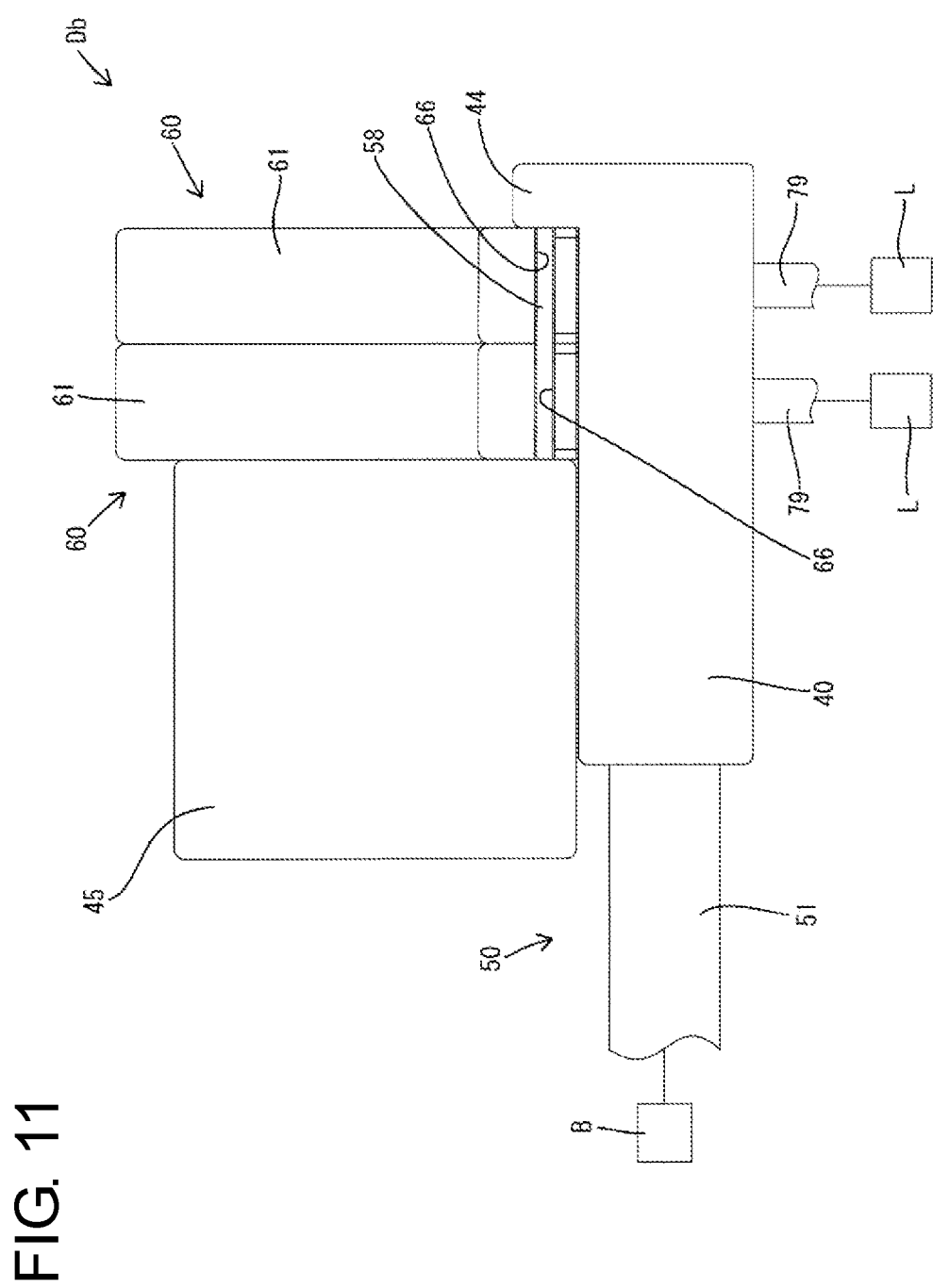
FIG. 11 is a left side view of a power distribution device of a second embodiment.
Figure 12:
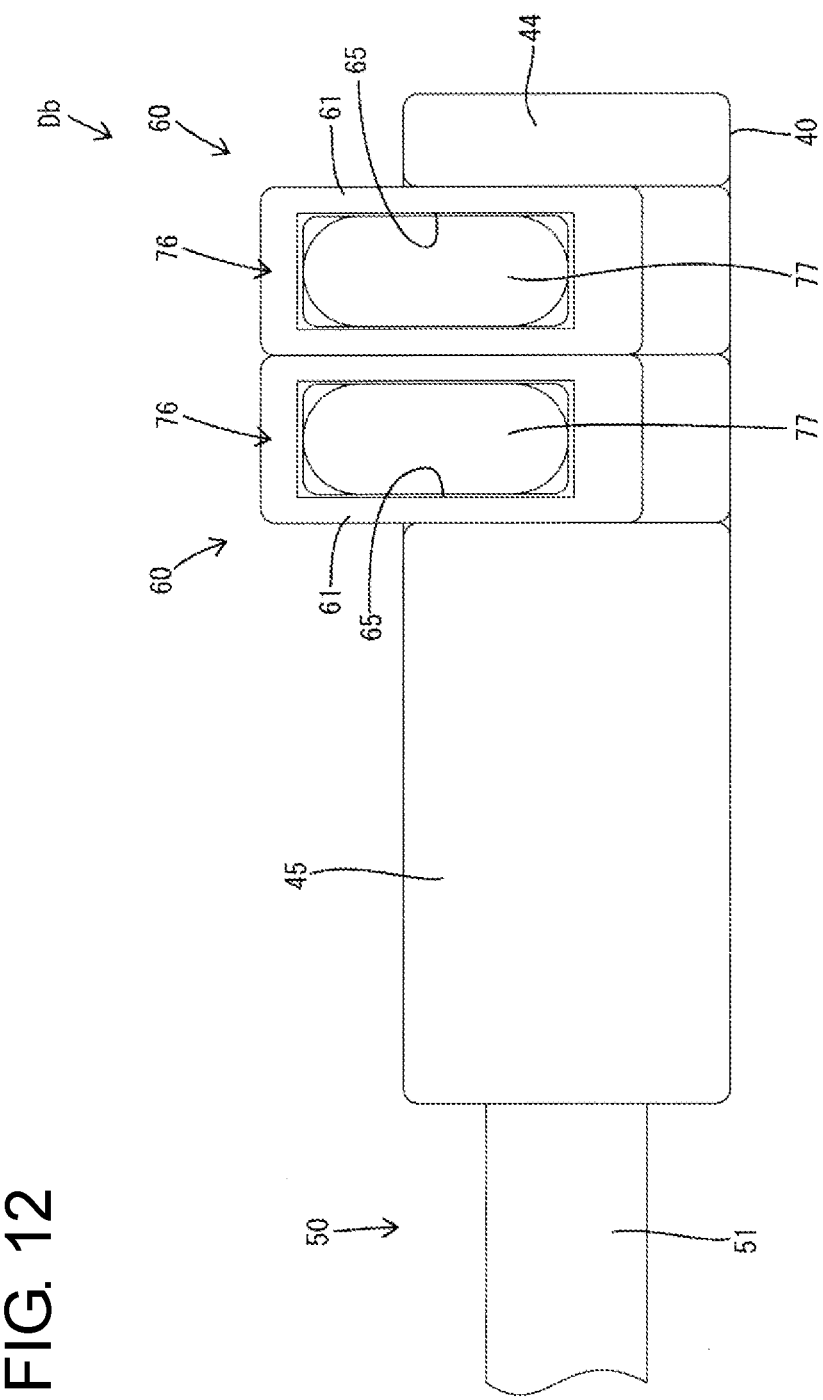
FIG. 12 is a plan view of the power distribution device.
Figure 13:
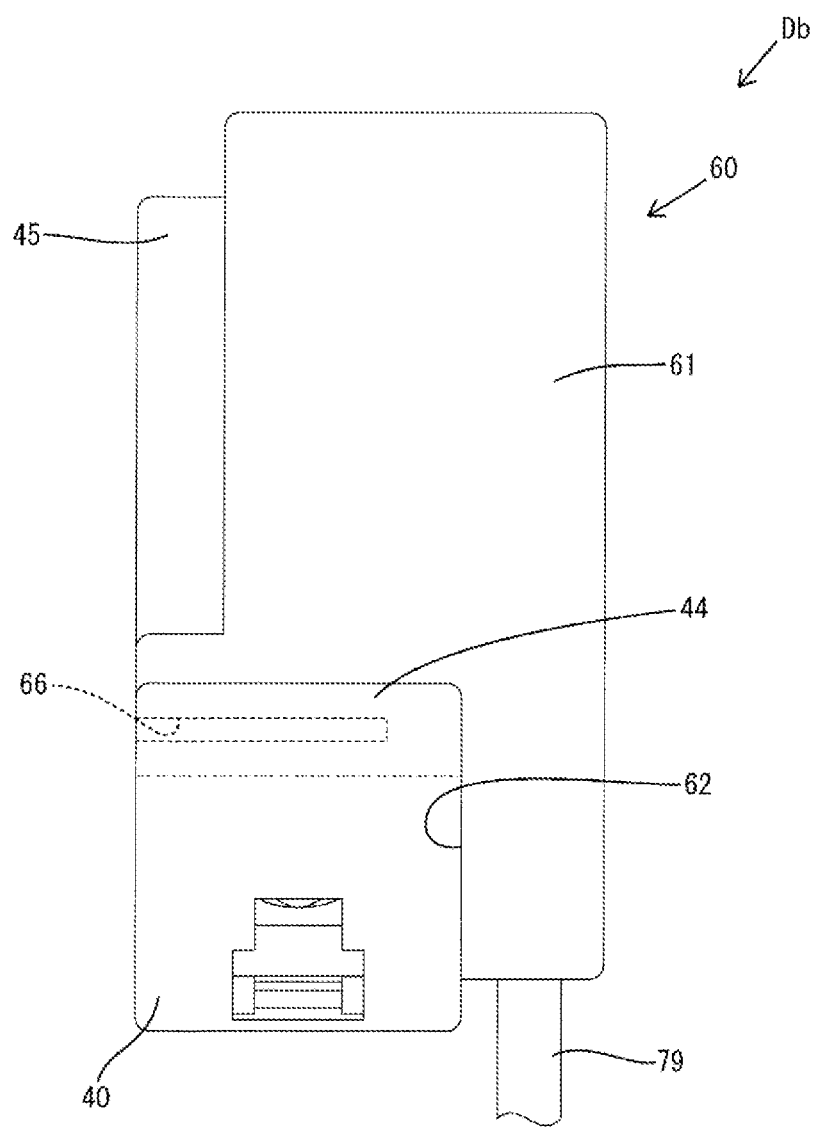
FIG. 13 is a front view of the power distribution device.

A second embodiment of the invention is described with reference to FIGS. 11 to 18. As shown in FIG. 11, a power distribution device Db of this second embodiment for distributing power supplied from a battery B (power supply as claimed) of an automotive vehicle to loads L (electrical components and the like). The power distribution device Db includes a base 40, a case 45, one input-side conductive path 50 to be connected to the power supply, as many terminal holders 60 as there are loads L and as many output-side conductive paths 97 as there are loads L. Power supplied from the battery B is distributed to the loads L on a leading end of the input-side conductive path 50.

Figure 14:
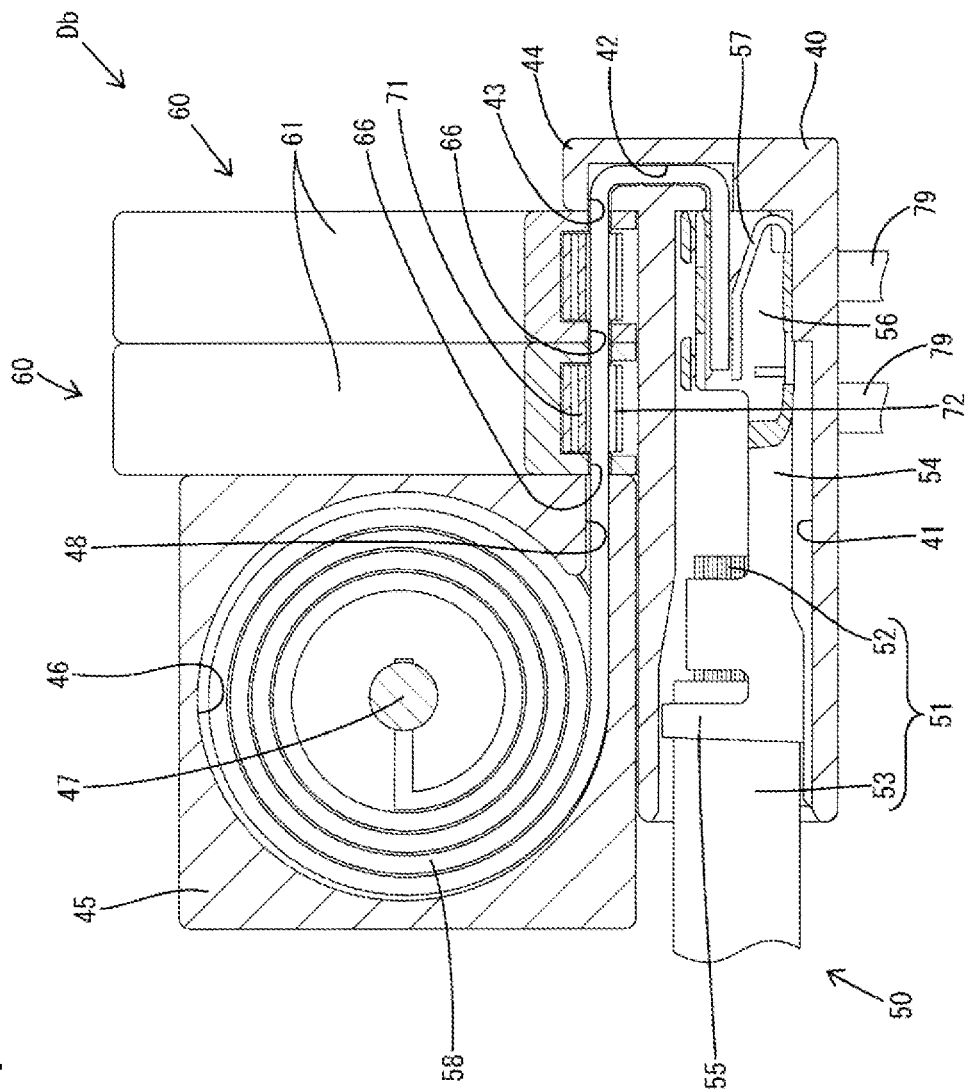
FIG. 14 is a side view in section of the power distribution device.

The base 40 is made of synthetic resin and, as shown in FIG. 14, an accommodation space 41 is formed in the base 40 and is open in the rear end surface of the base 40. A slit-like turning space 42 is formed in a front part of the base 40. The turning space 42 is arranged in front of the accommodation space 41 and a lower part of the turning space 42 communicates with the front end of the accommodation space 41. Further, a draw-out port 43 is formed in an upper part of the turning space 42. The draw-out port 43 is open rearward in a projecting portion 44 formed on a front part of the upper surface of the base 40.

The case 45 is made of synthetic resin and is placed on the upper surface of the base 40 in a state where the terminal holders 60 are not mounted. As shown in FIG. 14, a substantially circular storage chamber 46 is formed inside the case 45 and has a laterally oriented axis. A winding shaft 47 to which a resilient rotational force is applied in one direction is provided in a central part of the storage chamber 46. A pull-out hole 48 is formed in a lower end part of the storage chamber 46. The pull-out hole 48 extends in a front-rear direction to contact the inner peripheral surface of the lower end part of the storage chamber 46 and forms a slit-like opening long in the lateral direction in the front surface of the case 45. With the case 45 placed on the upper surface of the base 40, the pull-out hole 48 and the draw-out port 53 are at the same height.

As shown in FIG. 14, the input-side conductive path 50 includes a coated conductive path 51 in which one conductor 52 is surrounded by a cylindrical insulation coating 53. The input-side conductive path 50 also has a connection terminal 54 and a flexible conductive path 58. A base end part of the coated conductive path 51 is connected to the battery B. A leading end part of the coated conductive path 51 is connected to the connection terminal 54 with an axis thereof oriented in the front-rear direction.

The connection terminal 54 is long and narrow in the front-rear direction. A wire connecting portion 55 in the form of an open barrel is formed on a rear end part of the connection terminal 54, and this wire connecting portion 55 is crimped and conductively fixed to the leading end part of the coated conductive path 51. A rectangular tube 56 is formed on a front end part of the connection terminal 54 and has a resilient contact piece 57 inside. The connection terminal 54 is accommodated into the accommodation space 41 from behind the base 40 in a state fixed to the coated conductive path 51. The accommodated connection terminal 54 is held retained by an unillustrated locking means.

The flexible conductive path 58 is strip-like and freely deformable in a direction intersecting facing surfaces thereof. A base end part of the flexible conductive path 58 is accommodated in the turning space 42. more particularly, a most base end part of the flexible conductive path 58 projects from a lower end of the turning space 42 is inserted into the accommodation space 41, is accommodated into the rectangular tube 56 from front of the connection terminal 54 and is sandwiched resiliently sandwiched between an upper surface plate of the rectangular tube 56 and the resilient contact piece 57. In this way, the connection terminal 54 and the flexible conductive path 58 are conductively connected to define the input-side conductive path 50.

An area on a leading end side of the flexible conductive path 58, i.e. an area of the flexible conductive path 58 drawn out to the outside of the base 40 through the draw-out port 43, can be accommodated into the storage chamber 46 of the case 45. The flexible conductive path 58 is bent spirally in the storage chamber 46. Out of the spirally bent area of the flexible conductive path 58 in the storage chamber 46, an area connected to an outermost peripheral end is pulled out forward through the pull-out hole 48 to the outside of the case 45. An area of the flexible conductive path 58 exposed between the draw-out port 43 and the pull-out hole 48 is exposed substantially in parallel to the upper surface of the base 40. The terminal holders 60 are mounted in this exposed area.

The terminal holder 60 includes a housing 61 made of synthetic resin, one input-side terminal fitting 68 (terminal fitting as claimed), one output-side terminal fitting 73 and one fuse 76. A left-lower end part of the housing 61 is cut substantially at a right angle to form a positioning portion 62. With the terminal holder 60 mounted on the input-side conductive path 50, the positioning portion 62 is held in contact with the upper and right side surface of the base member 40 so that the housing 61 is positioned in the vertical direction and lateral direction with respect to the base 40

Figure 15:
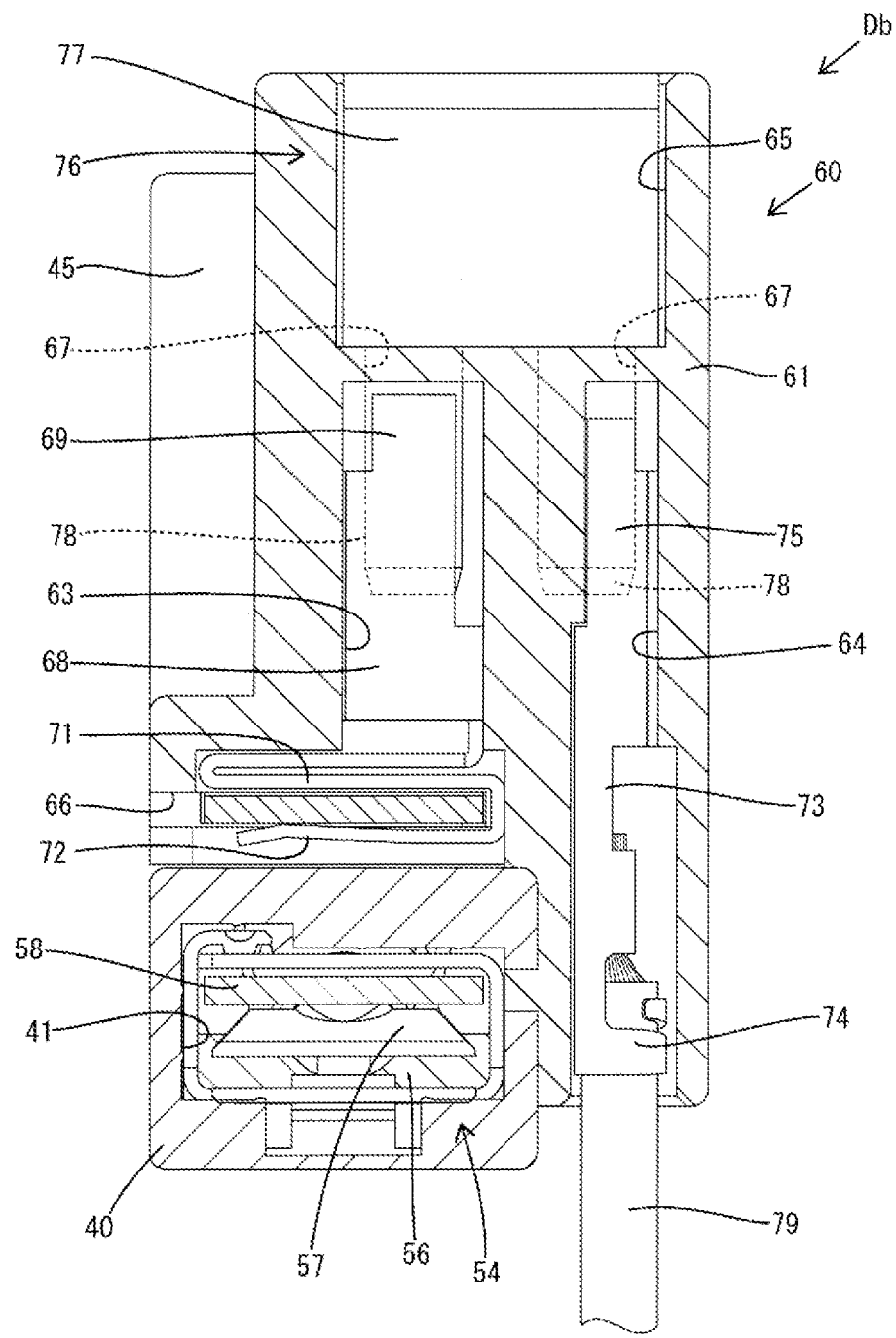
FIG. 15 is a front view in section of the power distribution device.
Figure 16:
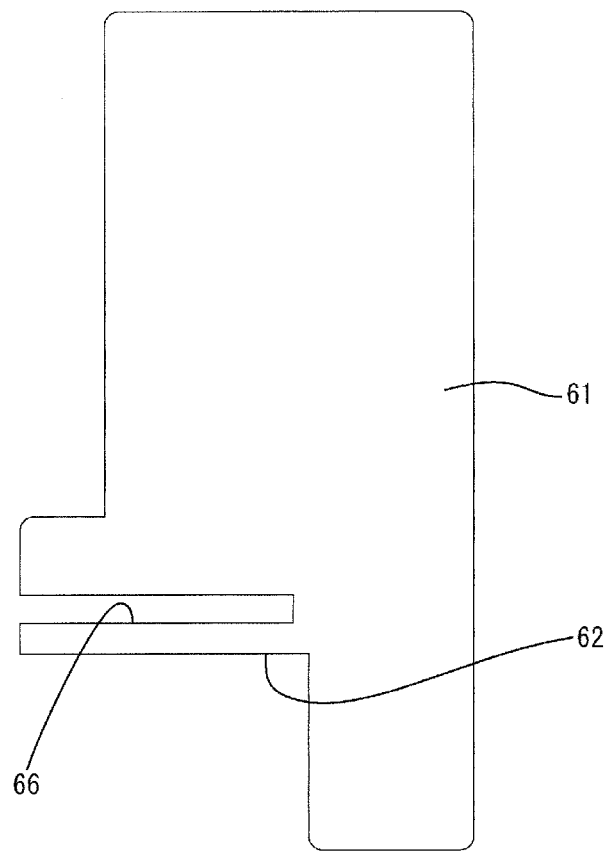
FIG. 16 is a front view of a housing constituting a terminal holder.

As shown in FIG. 15, an input-side terminal accommodating chamber 63, an output-side terminal accommodating chamber 64 and a fuse accommodating chamber 65 are formed inside the housing 61. The input-side terminal accommodating chamber 64 is arranged in a left area inside the housing 61 and is open in the lower end surface (positioning portion 62) of the housing 61. A cutout 66 is formed in a lower end part of the input-side terminal accommodating chamber 63 and is open in both front and rear surfaces and left side surface of the housing 61 to avoid interference with the flexible conductive path 58.

The output-side terminal accommodating chamber 64 is arranged in a right area inside the housing 61 and is open in an area of the lower end surface of the housing 61 to the right of the positioning portion 62. The fuse accommodating chamber 65 is arranged above the input-side terminal accommodating chamber 63 and the output-side terminal accommodating chamber 64 and is open in the upper end surface of the housing 61. The fuse accommodating chamber 65 and the input-side terminal accommodating chamber 63 communicate via a communication hole 67, and the fuse accommodating chamber 65 and the output-side terminal accommodating chamber 64 also communicate via a communication hole 67.

The input-side terminal fitting 68 is accommodated into the input-side terminal accommodating chamber 63 through an opening in the lower end surface of the housing 61. The accommodated input-side terminal fitting 68 is held accommodated by an unillustrated locking means. An input-side fuse connecting portion 69 in which front and rear spring pieces are arranged opposite to each other is formed on an upper end part of the input-side terminal fitting 68. The input-side fuse connecting portion 69 is arranged below the communication hole 67.

Figure 17:
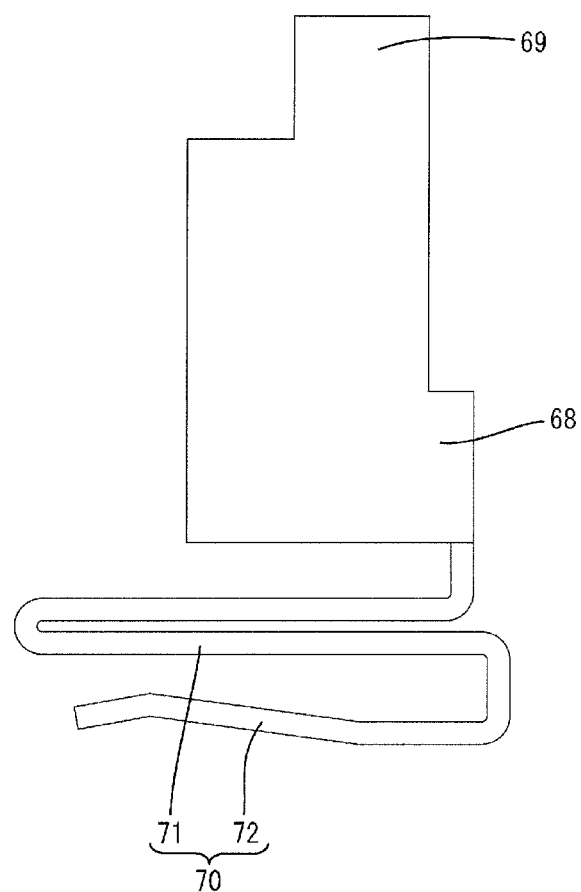
FIG. 17 is a front view of an input-side terminal fitting.
Figure 18:
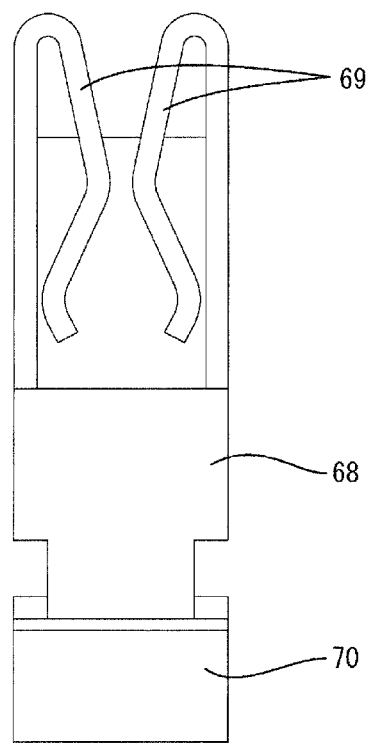
FIG. 18 is a right side view of the input-side terminal fitting.

As shown in FIG. 17, a resilient pinching portion 70 is formed on a lower end part of the input-side terminal fitting 68. The resilient pinching portion 70 includes a horizontal base plate 71 having a double plate structure and a resilient pressing piece 72 folded and connected to the right end edge of the base plate 71. The resilient pressing piece 72 is cantilevered left to face the lower surface of the base plate 71. That is, a space between the base plate 71 and the resilient pressing piece 72 is open leftward similar to the cutout 66. The resilient pinching portion 70 is located to correspond to the cutout 66. Thus, the resilient pinching portion 70 is fit to the flexible conductive path 58 (input-side conductive path 50) from the right. Further, in a free state where the resilient pinching portion 70 is not resiliently deflected, a minimum spacing between the lower surface of the base plate 71 and the upper surface of the resilient pressing piece 72 is smaller than a plate thickness of the flexible conductive path 58.

As shown in FIG. 15, the output-side terminal fitting 73 is long and narrow in the vertical direction, and is accommodated into the output-side terminal accommodating chamber 64 through an opening in the lower end surface of the housing 61. The accommodated output-side terminal fitting 73 is held accommodated by an unillustrated locking means. A crimping portion 74 in the form of an open barrel is formed on a lower end part of the output-side terminal fitting 73. This crimping portion 74 is crimped and conductively connected to a base end part of the output-side conductive path 79. An output-side fuse connecting portion 75 with opposite front and rear spring pieces is formed on an upper end part of the output-side terminal fitting 73. The output-side fuse connecting portion 75 is arranged below the communication hole 67.

As shown in FIG. 15, the fuse 76 includes a fuse body 77 accommodating a fusible portion (not shown) inside and left and right terminals 78 projecting from the lower end surface of the fuse body 77. The fuse 76 is accommodated into the fuse accommodating chamber 65 through an opening in the upper end surface of the housing 61. The accommodated fuse 76 is held accommodated by an unillustrated locking means. By accommodating the fuse 76 into the housing 61, one terminal 78 is connected to the input-side fuse connecting portion 69 through one communication hole 67 and the other terminal 78 is connected to the output-side fuse connecting portion 75 through the other communication hole 67.

Next, functions of this second embodiment are described. In assembling the power distribution device Db, the leading end part of the output-side conductive path 79 is connected to each load L (electrical component or the like) to be mounted in the vehicle and the output-side terminal fitting 73 fixed to the base end part of the output-side conductive path 79 is accommodated into the output-side terminal accommodating chamber 64 of the housing 61. Note that the input-side terminal fitting 68 and the fuse 76 are mounted in the housing 61. The terminal holder 60 connected to this load L in this way is connected to the input-side conductive path 50.

In connecting the terminal holder 60 to the input-side conductive path 50, the base 40 is slid rearward with respect to the case 45 and the area of the flexible conductive path 58 spirally accommodated in the storage chamber 46 is pulled out through the pull-out hole 48 to the outside of the case 45 by a necessary length and exposed between the pull-out hole 48 and the draw-out port 43. Then, the terminal holder 60 is mounted on this exposed area of the flexible conductive path 58 from the right. At this time, the cutout 66 and the flexible conductive path 58 are set at the same height and the resilient pinching portion 70 is fit to the flexible conductive path 58. In this way, the flexible conductive path 58 is sandwiched resiliently between the base plate 71 and the resilient pressing piece 72 of the resilient pinching portion 70 and the input-side conductive path 50 and the input-side terminal fitting 68 are connected conductively.

In mounting the terminal holder 60, the positioning portion 62 is brought into contact with the upper surface and right side surface of the base 40 and the housing 61 is brought into contact with the projecting portion 44 of the base 40 so that the terminal holder 60 is positioned in three dimensional directions (vertical, lateral and front-rear directions).

After the first terminal holder 60 is mounted, the other terminal holder 60 connected to the other load L is assembled with the input-side conductive path 50 in a manner similar to the above, and the input-side terminal fitting 68 thereof and the flexible conductive path 58 are connected conductively. At this time, the housings 61 of the adjacent terminal holders 60 are held in contact. Finally, after the last terminal holder 60 is mounted, the front surface of the case 45 is brought into contact with the rear surface of the housing 61 of the terminal holder 60 mounted at last. In this way, the entire device can be made compact.

As described above, the power distribution device Db of this second embodiment is for supplying power to the loads L, and includes the input-side conductive path 50 to be connected to the battery B, the terminal holders 60 each having the input-side terminal fitting 68 connectable to the input-side conductive path 50, and the output-side conductive paths 79 for individually connecting the input-side terminal fittings 68 and the loads L via the output-side terminal fittings 73. In this power distribution device Db, the number of the terminal holders 60 to be connected to the input-side conductive path 50 is equal to the number of the loads L, i.e. a minimum necessary number corresponding to the number of the loads L. Thus, miniaturization is realized.

Further, the end of the input-side conductive path 50 is formed into the flexible conductive path 58 having flexibility and connectable to the input-side terminal fittings 68, and the flexible conductive path 58 can be pulled out to the outside of the case 45 in a state accommodated in the case 45. According to this configuration, it is sufficient to pull out only the area of the flexible conductive path 58 to be connected to the input-side terminal fittings 68 to the outside of the case 45 so that a space taken up by the entire power distribution device Db can be made smaller.

The invention is not limited to the above described and illustrated embodiments. For example, the following embodiments also are included in the scope of the invention.

In the first and second embodiments, connecting parts of the conductor and the terminal fitting may be fixed by welding.

In the first and second embodiments, the adjacent terminal holders may be coupled by a locking means.

Although one input-side terminal fitting is provided in one terminal holder in the first and second embodiments, plural input-side terminal fittings may be provided in one terminal holder.

Although one output-side terminal fitting is provided in one terminal holder in the first and second embodiments, plural output-side terminal fittings may be provided in one terminal holder.

Although one output-side conductive path is provided in one terminal holder in the first and second embodiments, plural output-side conductive paths may be provided in one terminal holder.

The input-side terminal fitting to be connected to the input-side conductive path and the output-side terminal fitting connected to the output-side conductive path are separate in the first and second embodiments. However, both the input-side conductive path and the output-side conductive path may be connected directly to one terminal fitting.

The insulation coating of the input-side conductive path in an insulation displacement area of the input-side terminal fitting is removed in advance in the first embodiment. However, the input-side terminal fitting may be brought into pressure contact with the input-side conductive path while cutting the insulation coating open with the pressure contact blades.

The input-side conductive path and the input-side terminal fitting are connected using the pressure contact blades in the first embodiment. However, the input-side conductive path and the input-side terminal fitting may be connected methods, such as by crimping or resilient pinching.

The input-side conductive path and the input-side terminal fitting are connected by resilient pinching in the second embodiment. However, the input-side conductive path and the input-side terminal fitting may be connected by pressure contact blades or crimping.

Although the flexible conductive path is strip-like in the second embodiment, the flexible conductive path may be a wire material having a circular cross-section.

The flexible conductive path is wound spirally and accommodated in the case in the second embodiment. However, the shape of the flexible conductive path in the case is not limited to the spiral shape and may be a wavy shape, a zigzag shape or the like.

LIST OF REFERENCE SIGNS

Da . . . power distribution device
B . . . battery (power supply)
L . . . load
10 . . . input-side conductive path
11 . . . conductor
12 . . . insulation coating
13 . . . terminal holder
20 . . . input-side terminal fitting (terminal fitting)
22 . . . pressure contact blade
27 . . . cap (separation restricting member)
37 . . . output-side conductive path
Db . . . power distribution device
45 . . . case
50 . . . input-side conductive path
58 . . . flexible conductive path
60 . . . terminal holder
68 . . . input-side terminal fitting (terminal fitting)
79 . . . output-side conductive path

The invention claimed is:

1. A power distribution device for distributing power to a plurality of loads, comprising:
   terminal holders arranged side by side in an arranging direction, each of the terminal holders having a housing formed with opposite top and bottom ends, an input-side terminal accommodating chamber and an output-side terminal accommodating chamber extending into the bottom end and separated from one another by a wall, and a cutout communicating with the input-side terminal accommodating chamber;
   input-side terminal fittings accommodated respectively in the input-side terminal accommodating chambers;
   output-side conductive paths configured to connect the input-side terminal fittings and the loads;
   output-side terminal fittings accommodated respectively in the output-side terminal accommodating chambers, the output-side terminal fittings and the input-side terminal fittings being separate components that are spaced apart from one another, the output-side terminal fittings being connected respectively to the output-side conductive paths; and
   an input-side conductive path having a conductor to be connected to a power supply and an insulating coating surrounding the conductor, the input side conductive path extending straight in the arranging direction, through the input-side terminal accommodating chambers and connected to the input-side terminal fittings, wherein the cutouts are configured to permit insertion of the input-side conductive path through the cutouts in a direction perpendicular to an extending direction of the input-side conductive path and into connection with the input-side terminal fittings.

2. The power distribution device of claim 1, wherein:
   a connection area to the terminal fitting in the input-side conductive path has the insulation coating removed.

3. The power distribution device of claim 2, wherein the terminal fitting includes a pressure contact blade to be brought into pressure contact with the conductor.

4. The power distribution device of claim 3, wherein the terminal holder includes a separation restricting member configured to restrict the separation of the terminal fitting and the input-side conductive path.

5. The power distribution device of claim 4, wherein:
   an end part of the input-side conductive path is formed into a flexible conductive path having flexibility and connectable to the terminal fittings;
   the flexible conductive path is drawn out to the outside of a case in a state accommodated in the case.

6. The power distribution device of claim 1, wherein the terminal fitting includes a pressure contact blade to be brought into pressure contact with the conductor.

7. The power distribution device of claim 6, wherein the terminal holder includes a separation restricting member configured to restrict the separation of the terminal fitting and the input-side conductive path.

8. The power distribution device of claim 1, wherein:
   an end part of the input-side conductive path is formed into a flexible conductive path having flexibility and connectable to the terminal fittings;
   the flexible conductive path is drawn out to the outside of a case in a state accommodated in the case.

9. The power distribution device of claim 1, wherein the cutouts of the terminal holders are aligned with one another in the arranging direction of the terminal holders.

10. The power distribution device of claim 1, further comprising a fuse accommodating chamber extending into the top end and communicating with the input-side terminal accommodating chamber and the output-side terminal accommodating chamber.

11. The power distribution device of claim 10, further comprising a fuse accommodated in the fuse accommodating chamber and connected to the input-side terminal fittings and output-side terminal fittings.

12. A power distribution device for distributing power to a plurality of loads, comprising:

terminal holders arranged side by side in an arranging direction, each of the terminal holders having a housing formed with opposite top and bottom ends, an input-side terminal accommodating chamber and an output-side terminal accommodating chamber extending into the bottom end and separated from one another by a wall, a fuse accommodating chamber extending into the top end and communicating with the input-side terminal accommodating chamber and the output-side terminal accommodating chamber and a cutout communicating with the input-side terminal accommodating chamber;

input-side terminal fittings accommodated respectively in the input-side terminal accommodating chambers;

output-side conductive paths configured to connect the input-side terminal fittings and the loads;

output-side terminal fittings accommodated respectively in the output-side terminal accommodating chambers and spaced from the input-side terminal fittings, the output-side terminal fittings being connected respectively to the output-side conductive paths; and an input-side conductive path having a conductor to be connected to a power supply and an insulating coating surrounding the conductor, the input side conductive path extending straight in the arranging direction, through the input-side terminal accommodating chambers and connected to the input-side terminal fittings, wherein the cutouts are configured to permit insertion of the input-side conductive path through the cutouts in a direction perpendicular to an extending direction of the input-side conductive path and into connection with the input-side terminal fittings, wherein a fuse is insertable into the fuse accommodating chamber and is connectable to the input-side terminal fittings and the output side terminal fittings.

* * * * *